(12) United States Patent
Lee et al.

(10) Patent No.: US 8,985,853 B2
(45) Date of Patent: Mar. 24, 2015

(54) METHODS OF CALIBRATING X-RAY DETECTORS

(71) Applicant: Samsung Electronics Co., Ltd., Suwon-Si, Gyeonggi-Do (KR)

(72) Inventors: Chae-hun Lee, Suwon-si (KR); Jae-chul Park, Suwon-si (KR); Young Kim, Yongin-si (KR); Ho Kyung Kim, Busan (KR); Dae-kun Yoon, Daegu (KR)

(73) Assignees: Samsung Electronics Co., Ltd. (KR); Pusan National University Industry-University Cooperation Foundation (KR)

( * ) Notice: Subject to any disclaimer, the term of this patent is extended or adjusted under 35 U.S.C. 154(b) by 111 days.

(21) Appl. No.: 13/904,600

(22) Filed: May 29, 2013

(65) Prior Publication Data
US 2014/0119517 A1 May 1, 2014

(30) Foreign Application Priority Data
Nov. 1, 2012 (KR) .......................... 10-2012-0123098

(51) Int. Cl.
*G01D 18/00* (2006.01)
*G01T 7/00* (2006.01)
(52) U.S. Cl.
CPC .................................... *G01T 7/005* (2013.01)
USPC ...................................................... 378/207
(58) Field of Classification Search
CPC ........... A61B 6/58; A61B 6/582; A61B 6/585
USPC ........................................................ 378/207
See application file for complete search history.

(56) References Cited

U.S. PATENT DOCUMENTS

| | | |
|---|---|---|
| 5,206,174 A | 4/1993 | Gehrke et al. |
| 6,327,549 B1 | 12/2001 | Bingham et al. |
| 7,983,397 B2 | 7/2011 | Michel et al. |
| 2011/0233394 A1 | 9/2011 | Glasser et al. |
| 2012/0128131 A1 | 5/2012 | Kraft et al. |

FOREIGN PATENT DOCUMENTS

| | | |
|---|---|---|
| JP | 2010249534 A | 11/2010 |
| KR | 20080042806 A | 5/2008 |
| KR | 20110055870 A | 5/2011 |
| KR | 101094158 B1 | 12/2011 |

OTHER PUBLICATIONS

C. Ponchut et al. "Evaluation of a Photon-Couting Hybrid Pixel Detector Array With a Synchrotron X-Ray Source", Nuclear Instruments and Methods in Physics Research A 484 (2002) 396-406, Elsevier Science B.V.

*Primary Examiner* — Jurie Yun
(74) *Attorney, Agent, or Firm* — Harness, Dickey & Pierce, PLC

(57) ABSTRACT

A method of calibrating a first threshold voltage that is a reference of X-ray detection for each unit cell of a plurality of unit cells of an X-ray detector may comprise detecting an X-ray by using a plurality of second threshold voltages for each of a plurality of X-rays having spectra at different energy levels; determining a correspondence relationship between energies having a maximum intensity in the spectra of X-rays and third threshold voltages at which a maximum number of photons having a same energy intensity are detected; and/or calibrating the first threshold voltage based on the determined correspondence relationship.

15 Claims, 10 Drawing Sheets

METHODS OF CALIBRATING X-RAY DETECTORS

CROSS-REFERENCE TO RELATED APPLICATION(S)

This application claims priority from Korean Patent Application No. 10-2012-0123098, filed on Nov. 1, 2012, in the Korean Intellectual Property Office (KIPO), the disclosure of which is incorporated herein in its entirety by reference.

BACKGROUND

1. Field

Some example embodiments may relate to methods of calibrating X-ray detectors. Some example embodiments may relate to methods of calibrating threshold voltages of X-ray detectors that serve as core components of X-ray imaging systems used in the medical diagnosis field, the security clearance field, and/or the non-destructive testing field.

2. Description of the Related Art

An X-ray is a strongly transmissive electromagnetic wave having a wavelength corresponding to an intermediate wavelength between wavelengths of gamma rays and wavelengths of ultraviolet rays. When an X-ray is irradiated on a certain target object, a transmissivity of the X-ray varies according to a material forming the target object and a thickness of the target object, and an X-ray image may be generated using this principle.

For an X-ray detector for detecting X-rays among components of an X-ray imaging system, research on a photon-counting detector as a next-generation X-ray detector has been recently conducted to realize a low-dose system. In the photon-counting detector for measuring energy of individual incident X-ray photons, at least one threshold voltage may be set, and energy is distinguished based on the threshold voltage. Thus, to accurately measure energy, accurate calibration of a threshold voltage of an X-ray detector may be performed in advance.

Examples of methods of calibrating threshold voltage are methods using synchrotrons, methods using radioactive isotopes, and methods using special X-ray generation devices.

SUMMARY

Some example embodiments may provide methods of calibrating threshold voltages of X-ray detectors based on a correspondence relationship between energy of X-rays and the threshold voltages that are references of X-ray detection.

Some example embodiments may provide computer-readable recording mediums storing computer-readable programs for executing the methods.

In some example embodiments, a method of calibrating a first threshold voltage that is a reference of X-ray detection for each unit cell of a plurality of unit cells of an X-ray detector may comprise detecting an X-ray by using a plurality of second threshold voltages for each of a plurality of X-rays having spectra at different energy levels; determining a correspondence relationship between energies having a maximum intensity in the spectra of X-rays and third threshold voltages at which a maximum number of photons having a same energy intensity are detected; and/or calibrating the first threshold voltage based on the determined correspondence relationship.

In some example embodiments, the X-ray detector may be a photon-counting detector. The detecting of the X-ray may comprise measuring photons having energies greater than the corresponding third threshold voltages.

In some example embodiments, the detecting of the X-ray may comprise collecting X-ray detection signals from the plurality of unit cells for each of the plurality of second threshold voltages having different values.

In some example embodiments, the detecting of the X-ray may comprise correcting the collected X-ray detection signals to reduce errors that may occur according to characteristics of the plurality of unit cells.

In some example embodiments, the collecting of the X-ray detection signals may comprise collecting the X-ray detection signals a plurality of times without irradiating each corresponding X-ray for each of the plurality of second threshold voltages; collecting the X-ray detection signals a plurality of times by irradiating the corresponding X-ray for each of the plurality of second threshold voltages; and/or performing gain-offset correction of the X-ray detection signals collected by irradiating the corresponding X-ray at any one of the plurality of times.

In some example embodiments, the gain-offset correction may use mean values of the X-ray detection signals collected the plurality of times at each of the plurality of second threshold voltages.

In some example embodiments, each of the energies having the maximum intensity in a spectrum of a corresponding X-ray may be an energy showing the maximum intensity in an X-ray spectrum obtained by estimating a spectrum of the corresponding X-ray based on a half-value layer of the corresponding X-ray spectrum measured by using a spectrum simulator.

In some example embodiments, the energy showing the maximum intensity in the estimated X-ray spectrum may be extracted by performing regression analysis using a Gaussian function.

In some example embodiments, each of the third threshold voltages at which the maximum number of photons having the same energy intensity are detected may be obtained by using a first function indicating a measured number of photons having energy greater than each third threshold voltage for the plurality of second threshold voltages.

In some example embodiments, each of the third threshold voltages at which the maximum number of photons having the same energy intensity are detected may be a second threshold voltage having a maximum value in a second function indicating a number of photons having energy corresponding to the third threshold voltage by differentiating the first function with respect to the second threshold voltage.

In some example embodiments, the second threshold voltage having the maximum value in the second function may be extracted by performing regression analysis using a Gaussian function.

In some example embodiments, if a value of the first function exceeds permissible noise, a substitution function in which noise of an inflection point area of the first function, which corresponds to a maximum value area of the second function, may be used, and a function obtained by differentiating the substitution function is used as the second function.

In some example embodiments, the determining of the correspondence relationship may comprise determining the correspondence relationship by performing linear regression analysis when energy having the maximum intensity in a spectrum of each X-ray and a third threshold voltage at which a maximum number of photons having the same energy intensity are detected for the X-ray are determined.

In some example embodiments, the plurality of X-rays may be X-rays having the spectra at different energy levels by changing a tube voltage to be applied to a cathode and an anode of an X-ray tube for generating an X-ray or by changing a material forming the anode of the X-ray tube.

In some example embodiments, a computer-readable recording medium may be provided for storing a computer-readable program for executing a method of calibrating a first threshold voltage that is a reference of X-ray detection for each unit cell of a plurality of unit cells of an X-ray detector.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
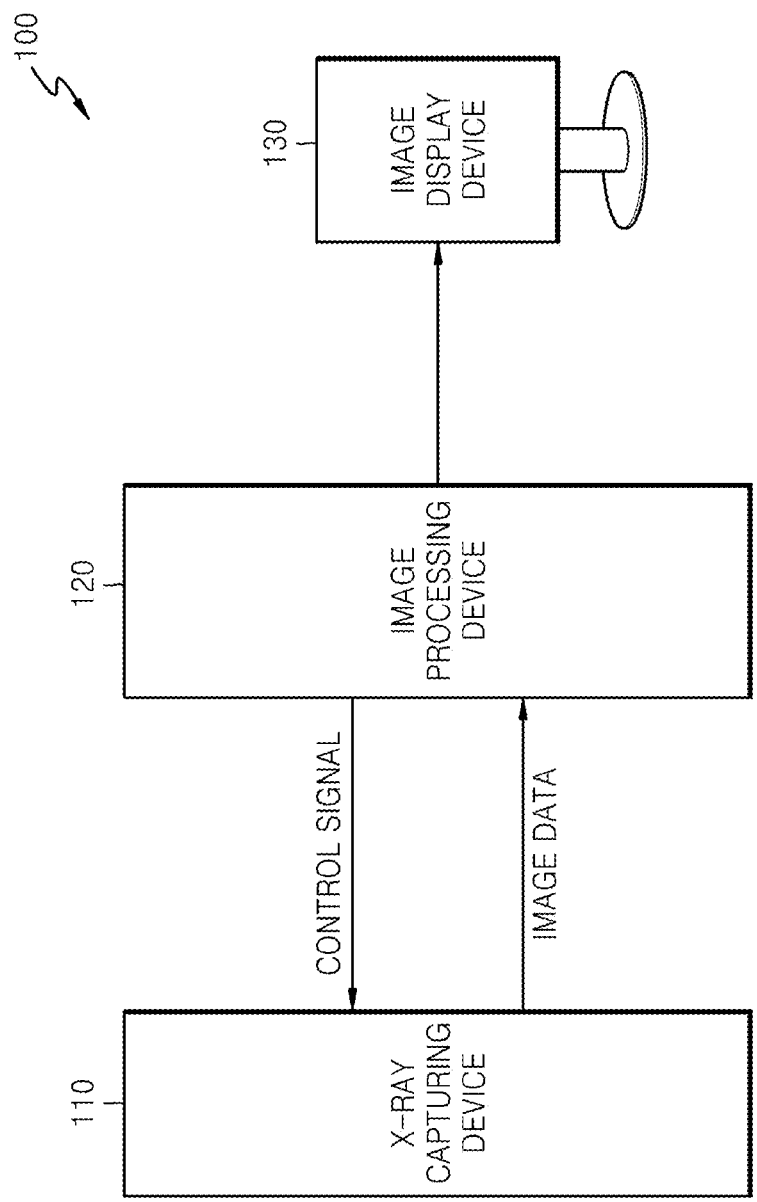
FIG. 1 is a block diagram of an X-ray imaging system according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the tell is first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that tell is, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Some example embodiments relate to a method of calibrating an X-ray detector, and a detailed description of the matters that are well known to one of ordinary skill in the art is omitted. The X-ray detector is widely used in various fields, such as the medical diagnosis field, the security clearance field, and the non-destructive testing field, and an X-ray imaging system including the X-ray detector, which will be described below, is not limited to these fields.

FIG. 1 is a block diagram of an X-ray imaging system 100 according to some example embodiments. Referring to FIG. 1, the X-ray imaging system 100 may include an X-ray capturing device 110, an image processing device 120, and an image display device 130.

Figure 2:
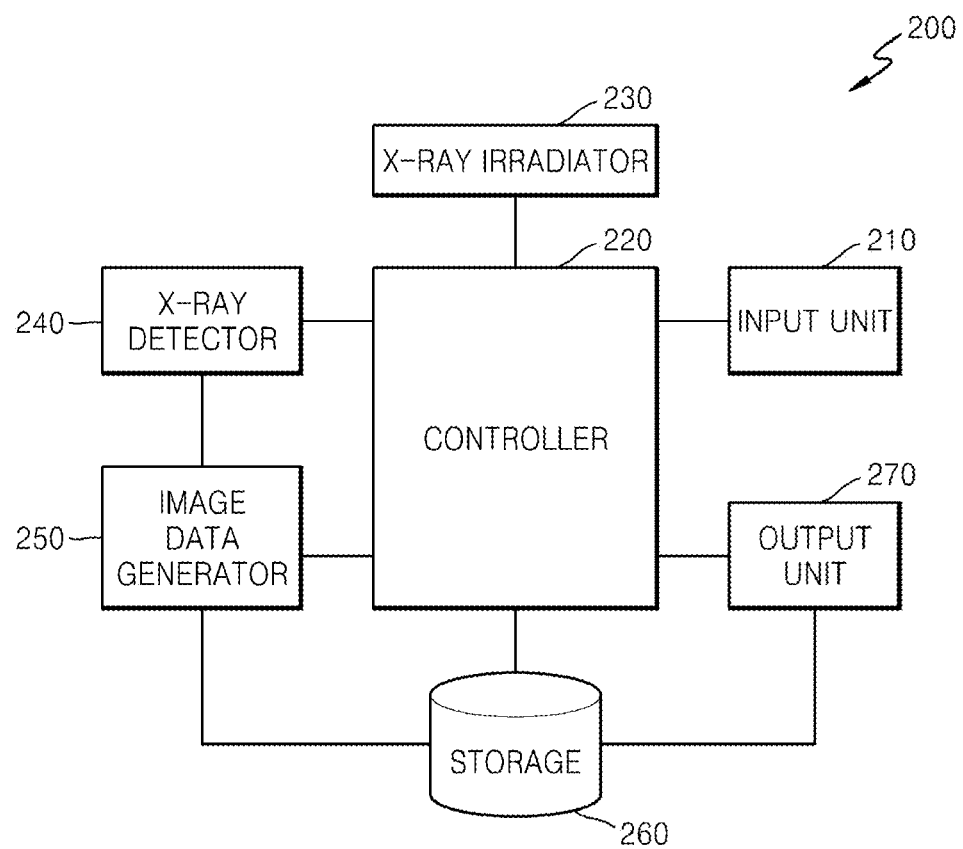
FIG. 2 is a block diagram of main components of an X-ray capturing device of FIG. 1, according to some example embodiments.

The X-ray capturing device 110 may include an X-ray irradiator (refer to 230 of FIG. 2) and an X-ray detector (refer to 240 of FIG. 2). The X-ray irradiator irradiates an X-ray towards a target object. The X-ray detector detects an X-ray transmitted through the target object and generates an electrical signal from the detected X-ray. After irradiating X-rays on the target object for a short time, only X-rays transmitted through the target object are detected by the X-ray detector, and information regarding the inside of the target object may be obtained based on positions at which the X-rays are detected. A plurality of electrical signals generated by the X-ray detector are converted to image data including the information regarding the inside of the target object, and the image data is transmitted to the image processing device 120.

The image processing device 120 receives the image data from the X-ray capturing device 110. The image processing device 120 generates an image to be displayed on the image display device 130 by using the image data.

The image display device 130 receives the image generated by the image processing device 120 and displays the image thereon.

FIG. 2 is a block diagram of main components of an X-ray capturing device 200 corresponding to the X-ray capturing device 110 of FIG. 1, according to some example embodiments. Referring to FIG. 2, the X-ray capturing device 200 may include an input unit 210, a controller 220, an X-ray irradiator 230, an X-ray detector 240, an image data generator 250, a storage 260, and an output unit 270.

The input unit 210 receives an X-ray capturing command from a user of the X-ray imaging system 100. That is, the input unit 210 receives all types of commands for controlling the X-ray capturing device 200, such as an X-ray irradiation command, a parameter adjustment command for changing an X-ray spectrum, a command related to storing of image data generated according to X-ray irradiation, and so forth. Information regarding all types of commands input from the user is transmitted to the controller 220. The controller 220 controls the components in the X-ray capturing device 200 in response to a command of the user.

The X-ray irradiator 230 receives all types of commands related to X-ray irradiation from the controller 220. The X-ray irradiator 230 irradiates an X-ray having a proper spectrum towards a target object. In this case, the X-ray irradiator 230 irradiates the X-ray by a proper number of counts and proper dose in consideration of an amount of irradiation of X-rays to which the target object is exposed.

In some example embodiments, a general commercial-use X-ray generation device, in which X-rays having spectra at different energy levels are used, is used. An X-ray spectrum indicates a distribution of intensity with respect to wavelengths of X-rays, in other words, the intensity of energy of X-rays. An X-ray is distinguished by a continuous X-ray with a continuous wavelength emitted as Bremsstrahlung radiation when an accelerated electron emitted from a cathode of an X-ray tube suddenly stops because of a collision with an anode thereof and a characteristic X-ray generated by energy emitted when an electron rotating along a predetermined orbit of an atom forming an anode moves quick towards the outside by receiving high energy and another electron moves into the position of the electron that moved. Thus, if a material forming an anode corresponding to a target on which an accelerated electron collides is changed, an X-ray having a different spectrum may be acquired even at the same voltage, and even though an element forming the anode is not changed, if a high voltage is applied, the accelerated electron may collide with the anode at a faster speed, thereby acquiring an X-ray having a different spectrum. In other words, to generate X-rays having heterogeneous spectra, a voltage applied to a cathode and an anode of an X-ray tube, i.e., a tube voltage, or a material foil ling the anode may be changed.

The X-ray irradiator 230 may include a parameter adjustment unit for generating a heterogeneous spectrum. When a parameter used to generate a heterogeneous X-ray spectrum is a tube voltage, the parameter adjustment unit may be a voltage adjustment unit for adjusting a voltage applied to a cathode and an anode of an X-ray tube, i.e., a tube voltage. In addition, when the parameter used to generate a heterogeneous X-ray spectrum is a material forming an anode on which an accelerated electron collides, the parameter adjustment unit may be a target change unit for changing an anode to be targeted. When the X-ray irradiator 230 includes a plurality of anodes respectively formed of different materials, the target change unit may locate any one of the plurality of anodes at a position where an accelerated electron collides, to generate an X-ray having a heterogeneous spectrum.

The X-ray detector 240 detects X-rays transmitted through the target object. That is, when the X-ray irradiator 230 irradiates X-rays, the X-ray detector 240 detects X-rays, which are transmitted through the target object and arrive at the X-ray detector 240. The X-ray detector 240 may include a set of a plurality of unit cells. The X-ray detector 240 converts an X-ray signal detected by each of the plurality of unit cells into an electrical signal, compares the electrical signal with a threshold voltage set to a corresponding cell, and measures an electrical signal that is equal to or greater than a corresponding threshold voltage. As the X-ray detector 240, a photoconductive X-ray detector, a photon-counting X-ray detector, or the like may be used.

The image data generator 250 receives measurement information of an X-ray detection signal, i.e., an electrical signal that is equal to or greater than a corresponding threshold voltage, from each unit cell of the X-ray detector 240. The image data generator 250 generates image data including information regarding the inside of the target object by using X-ray detection signals received from all unit cells forming the X-ray detector 240. For each X-ray irradiation, corresponding image data including information regarding the inside of the target object is generated.

The storage 260 stores the image data generated by the image data generator 250. The storage 260 transmits the stored image data to the output unit 270 in response to a request of the user.

Figure 3:
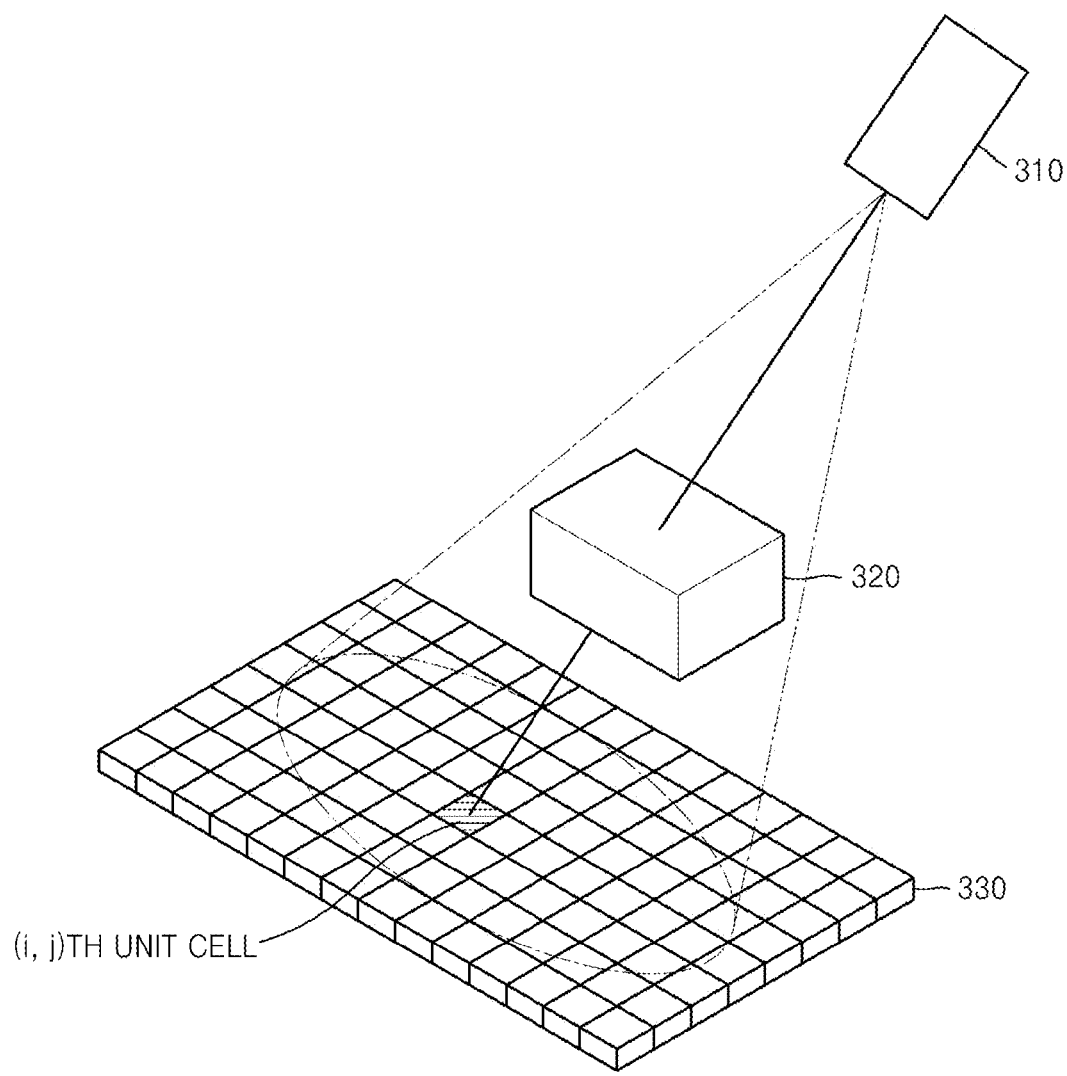
FIG. 3 illustrates a conceptual diagram in which an X-ray transmitted through a target object arrives at an X-ray detector when an X-ray irradiator irradiates the X-ray.

FIG. 3 illustrates a conceptual diagram in which an X-ray transmitted through a target object 320 arrives at an X-ray detector 330 when an X-ray irradiator 310 irradiates an X-ray. A process of detecting an X-ray transmitted through the target object 320 by the X-ray detector 330 will now be described with reference to FIG. 3. The X-ray irradiator 310 irradiates an X-ray towards the target object 320, and the irradiated X-ray may have a cone-beam shape but is not limited thereto. Only an X-ray transmitted through the target object 320 arrives at the X-ray detector 330, and the X-ray detector 330 may include unit cells having a desired (or alternatively, predetermined) size as shown in FIG. 3. The target object 320 is located on an X-ray irradiation path between an arbitrary unit cell of the X-ray detector 330 and the X-ray irradiator 310, and an X-ray is exponentially attenuated while transmitting through the target object 320. Thus, by detecting an X-ray arriving at the arbitrary unit cell of the X-ray detector 330, a degree of attenuation of the X-ray in the target object 320 may be perceived, and information regarding the inside of the target object 320 through which the X-ray has transmitted may be acquired from the degree of attenuation. In this case, the arbitrary unit cell of the X-ray detector 330 may be referred to as an (i, j)th unit cell according to a position thereof.

Unlike FIG. 3, an image generated from X-ray detection signals detected by the X-ray detector 330 by irradiating an X-ray without the target object 320 is called a white image, and an image generated from X-ray detection signals detected by the X-ray detector 330 without not only the target object 320 but also X-ray irradiation is called a dark image. The dark image is an image generated from signals output due to a characteristic of the X-ray detector 330 without X-ray irradiation and may be referred to as a noise image due to the characteristic of the X-ray detector 330.

Figure 4:
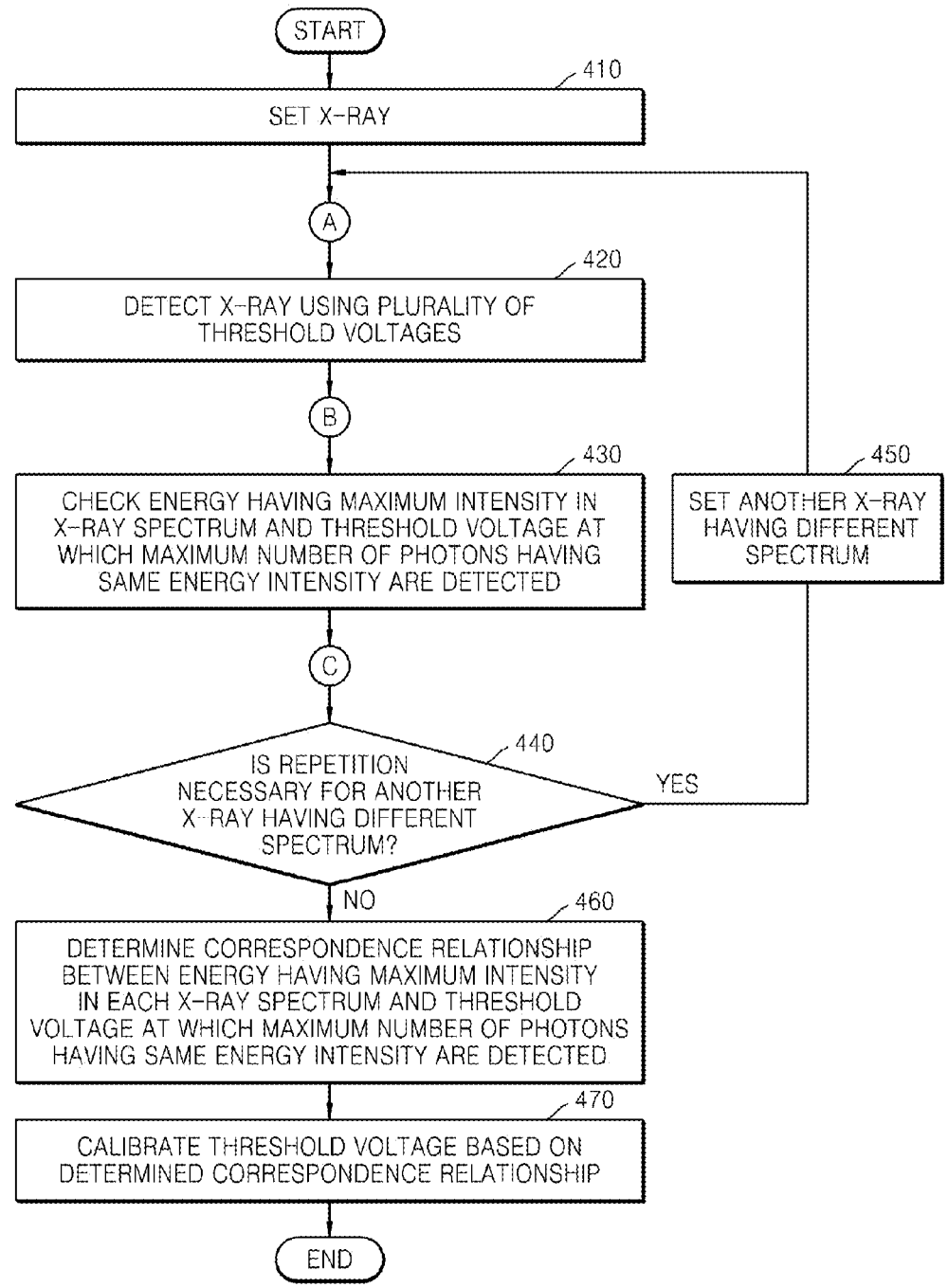
FIG. 4 is a flowchart illustrating a method of calibrating a threshold voltage of an X-ray detector, according to some example embodiments.

FIG. 4 is a flowchart illustrating a method of calibrating a threshold voltage of the X-ray detector 330, according to some example embodiments.

Referring to FIG. 4, in operation 410, an X-ray to be irradiated by the X-ray irradiator 310 is set. That is, a user may set a desired (or alternatively, predetermined) X-ray to be irradiated so that an energy value thereof varies. In detail, by changing a tube voltage to be applied to a cathode and an anode of an X-ray tube for generating an X-ray or a material forming the anode of the X-ray tube, an X-ray having a spectrum at a different energy level may be generated.

In operation 420, the X-ray detector 330 detects an X-ray by using a plurality of threshold voltages. For example, if energy of a photon of an X-ray, which has arrived at the X-ray detector 330, is greater than energy of a threshold voltage, the X-ray is detected. A photon-counting X-ray detector detects an X-ray by measuring photons having energy greater than a threshold voltage. The X-ray detector 330 detects an X-ray irradiated by the X-ray irradiator 310 by using the plurality of threshold voltages between a permissible minimum threshold voltage and a permissible maximum threshold voltage. In this case, even though the same X-ray is irradiated on each of the unit cells forming the X-ray detector 330, X-ray detection signals collected from the unit cells may be different from each other according to characteristics of devices forming the unit cells, a correction for reducing this difference occurring in X-ray detection may be necessary. A function indicating the measured number of photons having energy greater than a threshold voltage for each of the plurality of threshold voltages may be acquired by integrating X-ray detection signals at each threshold voltage, e.g., the number of photons measured at each threshold voltage, with respect to the plurality of threshold voltages. Operation 420 will now be described in more detail with reference to FIG. 5.

Figure 5:
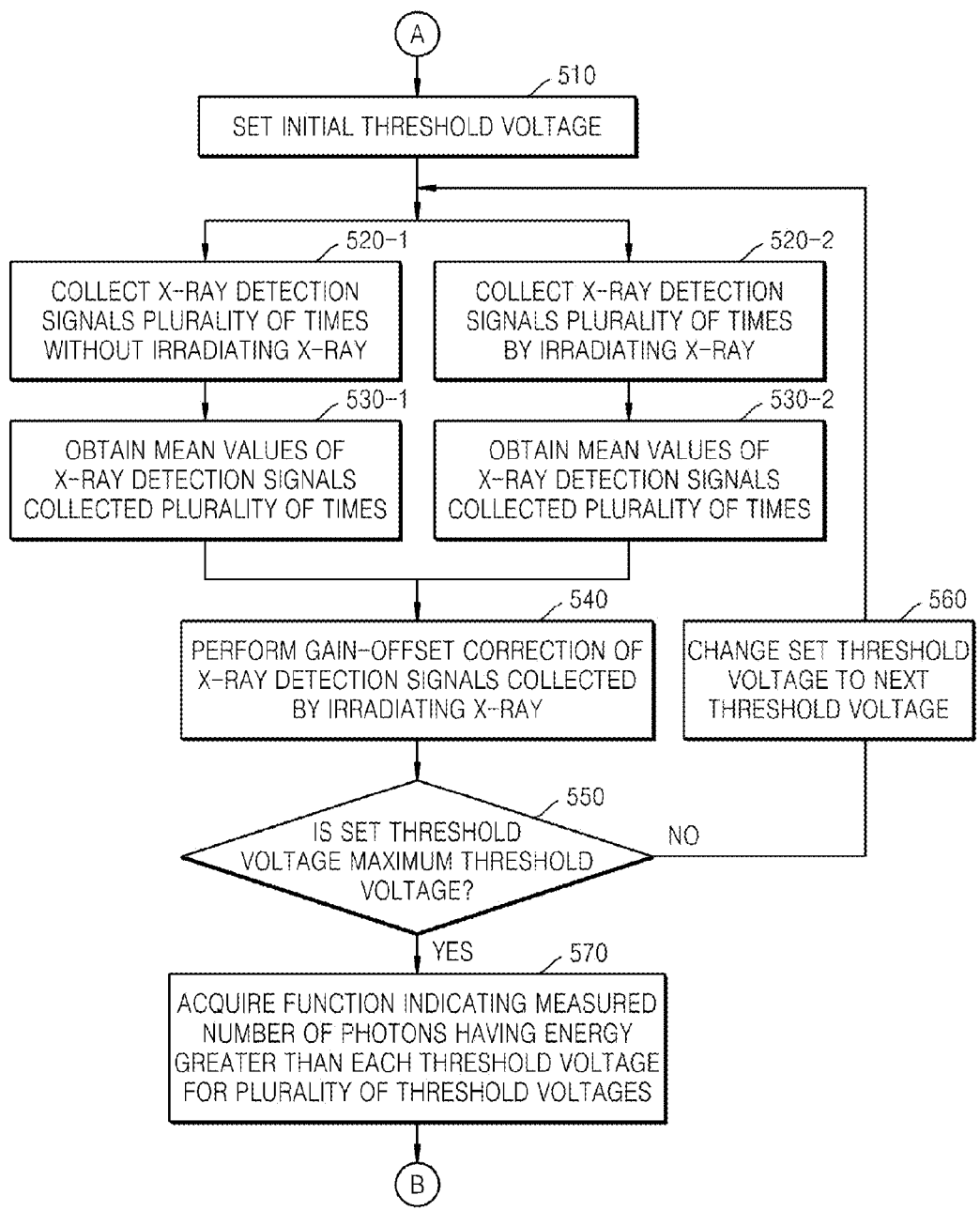
FIG. 5 is a flowchart illustrating operation 420 of FIG. 4, according to some example embodiments.

FIG. 5 is a flowchart illustrating operation 420 of FIG. 4, according to some example embodiments.

Referring to FIG. 5, in operation 510, an initial threshold voltage of each unit cell of the X-ray detector 330 is set. At least one threshold voltage may be set for each unit cell, and a plurality of threshold voltages may be set. When an X-ray incident on the X-ray detector 330 is converted to an electrical signal, only an electrical signal equal to or greater than at least one threshold voltage is measured by comparing the electrical signal with the at least one threshold voltage set to each unit cell, and when a plurality of threshold voltages is set, a desired (or alternatively, predetermined) threshold voltage is used according to the intensity of energy which a photon of the X-ray has.

In operation 520-1, X-ray detection signals are collected from unit cells of the X-ray detector 330 a plurality of times without irradiating an X-ray. Even though no X-rays are irradiated, output signals may be collected from the unit cells of the X-ray detector 330, the output signals are noise values according to characteristics of devices respectively forming the unit cells of the X-ray detector 330. That is, in operation 520-1, X-ray detection signals are collected from the unit cells without irradiating an X-ray to obtain unique output signals which the unit cells of the X-ray detector 330 have. As such, by collecting X-ray detection signals a plurality of times, mean X-ray detection signals of the unit cells may be obtained. The X-ray detection signal collected from each of the unit cells of the X-ray detector 330 without irradiating an X-ray may be represented by Equation 1.

$$I_0(i, j; v) \qquad (1)$$

In Equation 1, 'i' and 'j' denote a position of a unit cell of the X-ray detector 330, and 'v' denotes a threshold voltage.

In operation 530-1, mean values of the X-ray detection signals collected from the respective unit cells a plurality of times, e.g., $L_0$ times, without irradiating an X-ray are obtained. The mean X-ray detection signal at each of the unit cells may be used to correct errors occurring due to characteristic differences between the unit cells and may be represented by Equation 2.

$$\overline{I_0^l(i, j; v)} = \frac{\sum_{l=1}^{l=L_0} I_0^l(i, j; v)}{L_0} \qquad (2)$$

In operation 520-2, X-ray detection signals are collected from the unit cells of the X-ray detector 330 a plurality of times by irradiating an X-ray. Even for the same X-ray, different X-ray detection signals may be collected from the unit cells according to the characteristics of the unit cells. That is, in operation 520-2, X-ray detection signals are collected from each unit cell by irradiating an X-ray to check the X-ray detection signals according to gain or offset differences between the unit cells of the X-ray detector 330. As such, by collecting the X-ray detection signals a plurality of times, mean X-ray detection signals at the unit cells may be obtained. An X-ray detection signal collected from each of the unit cells by irradiating an X-ray having the maximum intensity $E_p$ may be represented by Equation 3.

$$I_{E_p}(i, j; v) \qquad (3)$$

In operation 530-2, mean values of the X-ray detection signals collected from the respective unit cells a plurality of times, e.g., $L_E$ times, by irradiating an X-ray are obtained. The mean X-ray detection signal at each of the unit cells may be used to correct errors occurring due to characteristic differences between the unit cells and may be represented by Equation 4.

$$\overline{I^l_{E_p}(i, j; v)} = \frac{\sum_{l=1}^{l=L_E} I^l_{E_p}(i, j; v)}{L_E} \qquad (4)$$

In operation 540, gain-offset correction is performed for the X-ray detection signals collected at the set threshold voltage from the respective unit cells of the X-ray detector 330 by irradiating an X-ray to reduce errors between the unit cells, which occur according to differences between the unique characteristics which the unit cells of the X-ray detector 330 have. The gain-offset correction is performed using the mean values of the X-ray detection signals collected at the set threshold voltage a plurality of times. The X-ray detection signal for which the gain-offset correction has been performed may be represented by Equation 5.

$$\hat{I}^l_{E_p}(i, j; v) = \frac{I^l_{E_p}(i, j; v) - B}{A - B} \times ROI\{A - B\} \qquad (5)$$

where $$A = \overline{I^l_{E_p}(i, j; v)}, B = \overline{I^l_0(i, j; v)}$$

In Equation 5, ROI denotes a region of interest, and a region showing relatively uniform gains in a gain map of the X-ray detection signals for which the gain-offset correction has been performed, i.e., X-ray detection signals, is set as an ROI, and a mean gain value in the ROI is assumed as a mean gain of the X-ray detection signals.

In operation 550, it is determined that the threshold voltage set to each unit cell of the X-ray detector 330 is the maximum threshold voltage permitted by the X-ray detector 330, to collect X-ray detection signals from each unit cell of the X-ray detector 330 at each of various threshold voltages up to the maximum threshold voltage permitted by the X-ray detector 330. If the set threshold voltage is not the maximum threshold voltage, operation 560 is performed. Otherwise, if the set threshold voltage is the maximum threshold voltage, operation 570 is performed.

In operation 560, the set threshold voltage is changed to a next threshold voltage. If the number of set threshold voltages is plural, all of the set threshold voltages are changed. The changed threshold voltage is set as a threshold voltage of each unit cell of the X-ray detector 330.

In operation 570, a function indicating an X-ray detection signal according to a change in threshold voltages may be acquired by integrating X-ray detection signals at each threshold voltage with respect to all the threshold voltages. For a photon-counting detector, the X-ray detection signal is the measured number of photons having energy greater than a threshold voltage, and a first function indicating the measured number of photons having energy greater than a threshold voltage for all the threshold voltages may be acquired and represented by Equation 6.

$$\hat{I}^l_{E_p}(i, j; v) \text{ for all } v \qquad (6)$$

Referring back to FIG. 4, in operation 430, energy having the maximum intensity in a spectrum of the X-ray irradiated by the X-ray irradiator 310 is checked, and a threshold voltage at which a maximum number of photons having the same energy intensity are detected is checked from the first function indicating the measured number of photons having energy greater than a threshold voltage for each of the threshold voltages, which is acquired in operation 420. Operation 430 will now be described in more detail with reference to FIG. 6.

Figure 6:
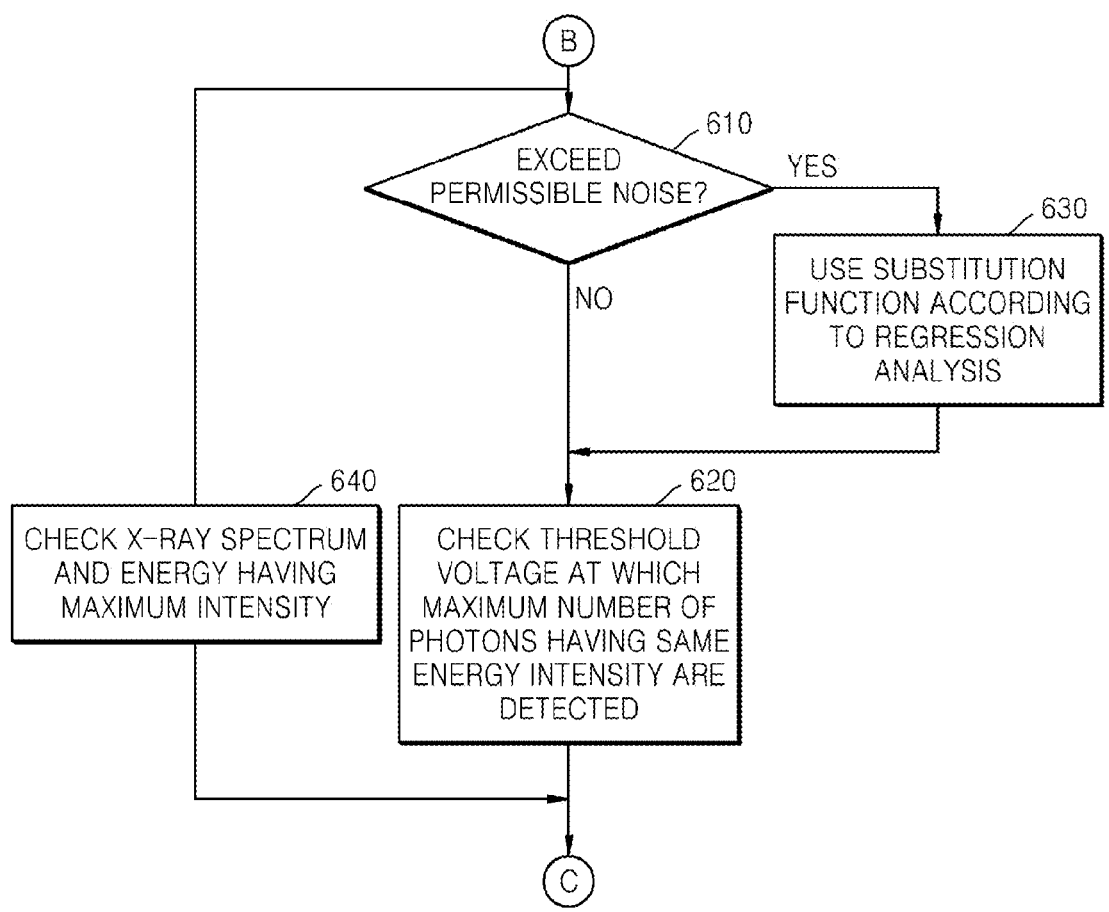
FIG. 6 is a flowchart illustrating operation 430 of FIG. 4, according to some example embodiments.

FIG. 6 is a flowchart illustrating operation 430 of FIG. 4, according to some example embodiments.

Referring to FIG. 6, in operation 610, it is determined whether a value of the first function indicating the measured number of photons having energy greater than a threshold voltage for each of the threshold voltages has noise exceeding permissible noise. As a result of the determination, a method of checking a threshold voltage at which a maximum number of photons having the same energy intensity are detected by using the first function varies.

Figure 7:
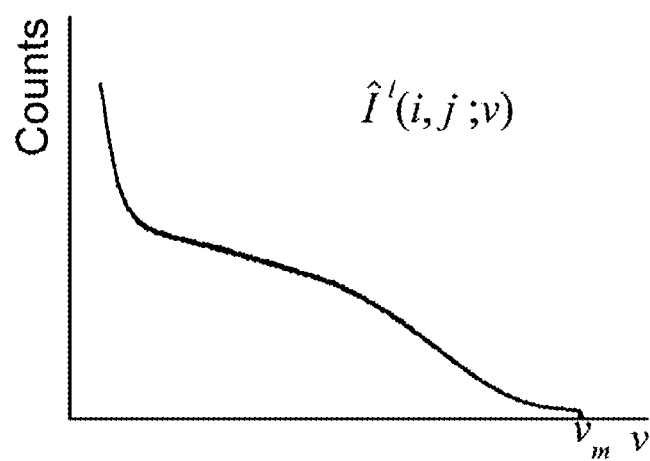
FIG. 7 is a graph of a first function indicating the measured number of photons having energy greater than each threshold voltage for threshold voltages.

FIG. 7 is a graph of the first function indicating the measured number of photons having energy greater than each threshold voltage for threshold voltages. In FIG. 7, $v_m$ denotes a maximum threshold voltage. When noise less than the permissible noise exists in the first function, operation 620 is performed.

Figure 8:
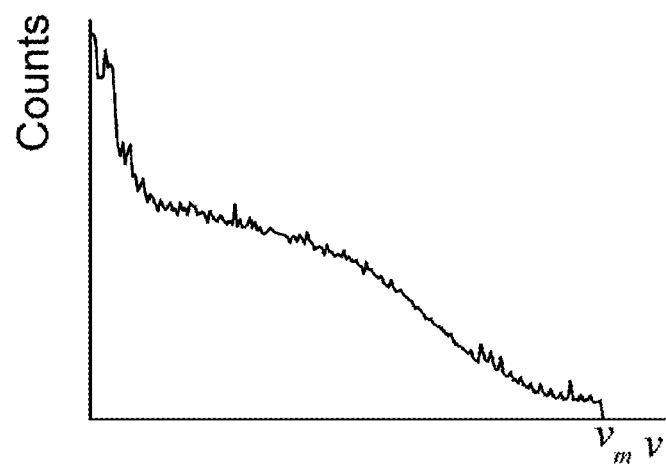
FIG. 8 is a graph of a case where noise exceeding permissible noise exists in the first function indicating the measured number of photons having energy greater than each threshold voltage for threshold voltages.

FIG. 8 is a graph of a case where noise exceeding the permissible noise exists in the first function indicating the measured number of photons having energy greater than each threshold voltage for threshold voltages. In this case, since an influence of the noise exists as it is even in a function obtained by differentiating the first function, it is difficult to extract a threshold voltage having the maximum value in the differentiated function. As such, if noise exceeding the permissible noise exists in the first function, operation 630 is performed.

Referring back to FIG. 6, in operation 620, a second function indicating the number of photons having energy corresponding to a desired (or alternatively, predetermined) threshold voltage is obtained by differentiating the first function with respect to the threshold voltage and may be represented by Equation 7.

$$f(i, j; v) = \frac{\Delta \hat{I}^l_{E_p}(i, j; v)}{\Delta v} \text{ for all } v \qquad (7)$$

A threshold voltage having the maximum value in the second function indicates a threshold voltage at which a maximum number of photons having the same energy intensity are detected. The threshold voltage having the maximum value may be extracted by performing regression analysis using a Gaussian function.

Figure 9:
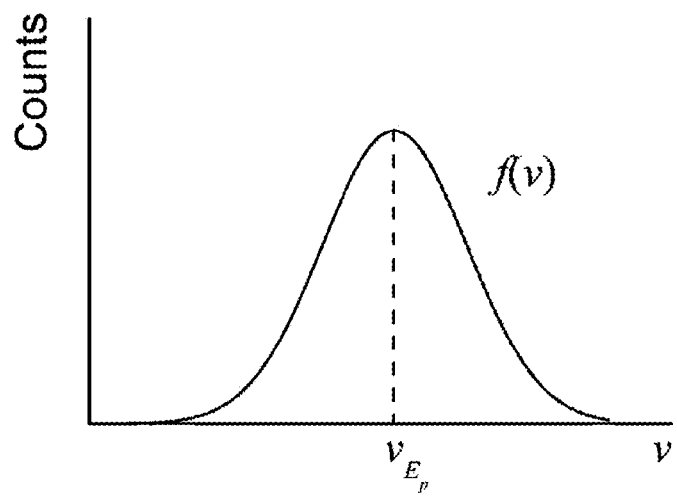
FIG. 9 is a graph of a second function indicating the number of photons having energy corresponding to a desired (or alternatively, predetermined) threshold voltage for threshold voltages.

FIG. 9 is a graph of the second function indicating the number of photons having energy corresponding to the desired (or alternatively, predetermined) threshold voltage for threshold voltages. According to the graph of FIG. 9, the maximum value is obtained at a threshold voltage $V_{E_p}$.

Referring back to FIG. 6, in operation 630, a substitution function determined by regression analysis is used instead of the first function having noise exceeding the permissible noise. That is, to remove the noise existing in the first function, the first function is regression-analyzed with an error function.

Figure 10:
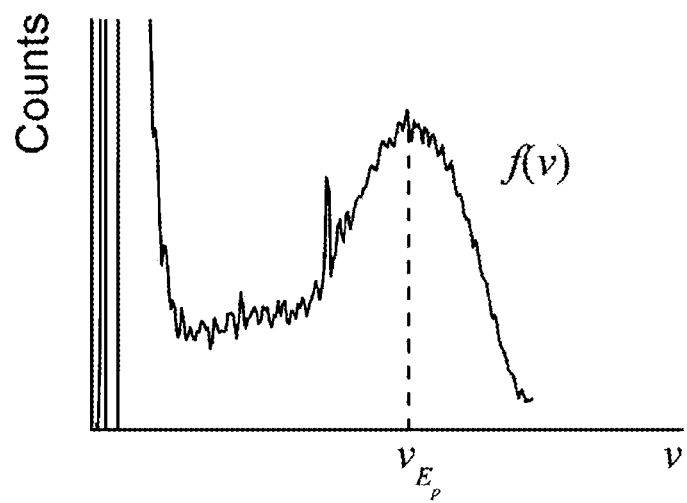
FIG. 10 is a graph of a case where noise exists in the second function indicating the number of photons having energy corresponding to a desired (or alternatively, predetermined) threshold voltage for threshold voltages.

FIG. 10 is a graph of a case where noise exists in the second function indicating the number of photons having energy corresponding to the desired (or alternatively, predetermined) threshold voltage for threshold voltages. That is, since the first function has noise exceeding the permissible noise, the second function obtained by differentiating the first function also has severe noise as shown in FIG. 10. In the second function having severe noise, it is difficult to accurately find a maximum value, and accordingly, it is also difficult to accurately identify a threshold voltage having the maximum value of the second function. Thus, in this case, a substitution function to replace the first function having noise exceeding the permissible noise is necessary.

Figure 11:
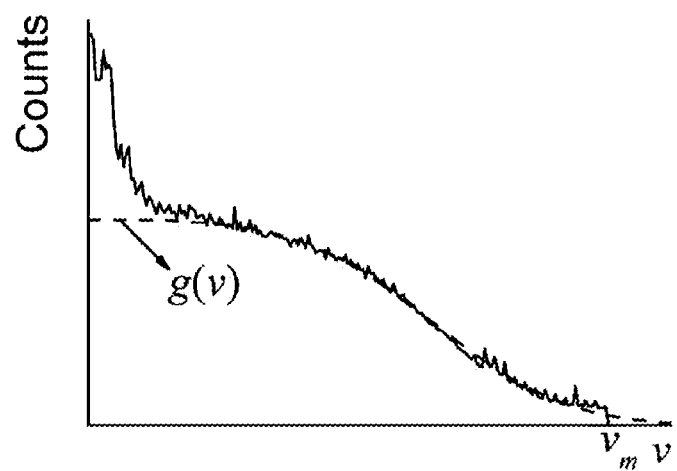
FIG. 11 is a graph showing a substitution function in which noise of an inflection point area of the first function is removed by regression analysis, together with the case where noise exceeding permissible noise exists in the first function indicating the measured number of photons having energy greater than each threshold voltage for threshold voltages.

FIG. 11 is a graph showing a substitution function in which noise of an inflection point area of the first function is removed by regression analysis, together with the case where noise exceeding the permissible noise exists in the first function indicating the measured number of photons having energy greater than each threshold voltage for threshold voltages. Since the second function is acquired by differentiating the first function, to accurately find a maximum value in the second function, a substitution function in which noise of the inflection point area of the first function corresponding to a maximum value area of the second function is removed is necessary. In FIG. 11, a substitution function g(v) describing the inflection point area of the first function is shown as a dashed line, and when the substitution function g(v) is differentiated and used as the second function, since the substitution function g(v) is used by removing only noise from the inflection point area of the first function, values near the maximum value area of the second function may be reliable.

Thus, when the first function has noise exceeding the permissible noise, the second function is obtained from a substitution function determined by regression analysis, and a threshold voltage at which a maximum number of photons having the same energy intensity may be checked from the obtained second function.

Referring back to FIG. 6, in operation 640, a spectrum of the X-ray irradiated by the X-ray irradiator 310 and energy having the maximum intensity are checked. First, a half-value layer of the X-ray spectrum is measured, and the spectrum of the X-ray is estimated based on the measured half-value layer by using a spectrum simulator. Energy having the maximum intensity in the estimated X-ray spectrum is checked.

Figure 12:
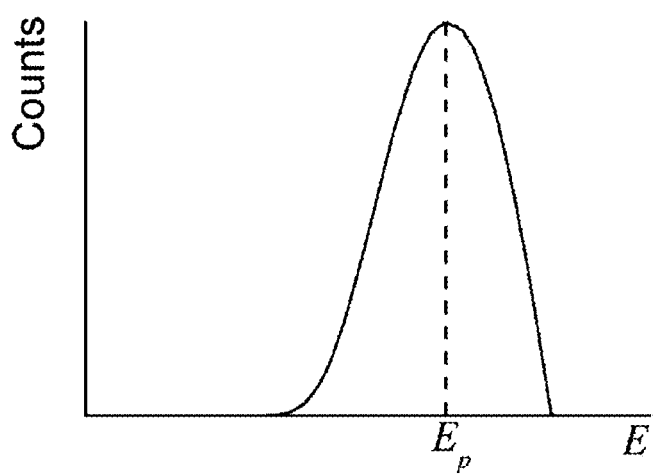
FIG. 12 is a graph showing a spectrum of an irradiated X-ray and energy indicating the maximum intensity, which are estimated using a spectrum simulator.

FIG. 12 is a graph showing a spectrum of an irradiated X-ray and energy indicating the maximum intensity, which are estimated using a spectrum simulator. In the graph of FIG. 12, energy Ep indicating the maximum intensity of the X-ray spectrum may be checked. The energy Ep indicating the maximum intensity may be extracted by performing regression analysis using a Gaussian function.

Referring back to FIG. 4, in operation 440, it is determined whether operations 420 and 430 are necessary for another X-ray having a spectrum at a different energy level. To obtain a relationship between energy of X-rays and threshold voltages as a linear equation, it is necessary to perform operations 420 and 430 for at least two X-rays having different spectra.

In operation 450, when operations 420 and 430 are performed again for another X-ray having a different spectrum, the X-ray having a spectrum at a different energy level may be set by changing a tube voltage to be applied to the cathode and the anode of the X-ray tube for generating an X-ray or a material forming the anode of the X-ray tube. For the set X-ray having a different spectrum, operations 420 to 440 are repeatedly performed.

If enough data to determine the relationship between energy of X-rays and threshold voltages is secured, in operation 460, a correspondence relationship between energy having the maximum intensity in a spectrum of each X-ray irradiated by the X-ray irradiator 310 and a threshold voltage at which a maximum number of photons having the same energy intensity are detected is determined. When the energy having the maximum intensity in the spectrum of each X-ray irradiated by the X-ray irradiator 310 and the threshold voltage at which a maximum number of photons having the same energy intensity are detected when the X-ray arrives at the X-ray detector 330 are determined, the correspondence relationship may be determined by performing linear regression analysis.

Figure 13:
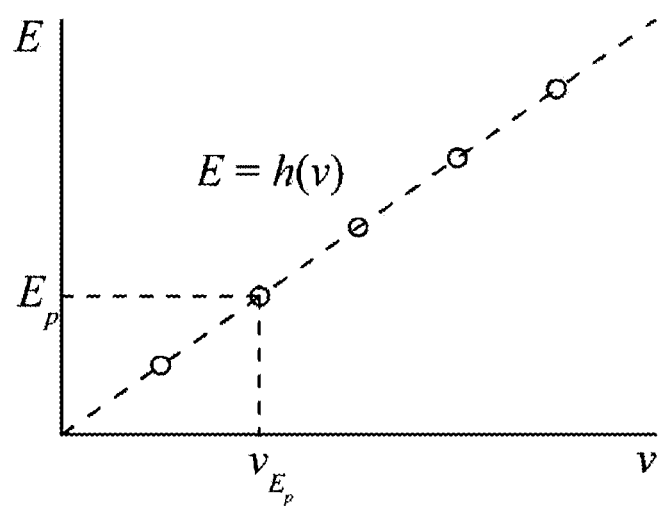
FIG. 13 is a graph showing a correspondence relationship between energies having the maximum intensity in spectra of irradiated X-rays and threshold voltages at which a maximum number of photons having the same energy intensity are detected.

FIG. 13 is a graph showing a correspondence relationship between energies having the maximum intensity in spectra of irradiated X-rays and threshold voltages at which a maximum number of photons having the same energy intensity are detected. FIG. 13 shows that regression analysis is performed by a linear equation using a data pair of the threshold voltage at which a maximum number of photons having the same energy intensity are detected and the energy having the maximum intensity in the spectrum of the irradiated X-ray, which are respectively checked in FIGS. 9 and 12. The correspondence relationship between energies of X-rays and threshold voltages may be determined from a plurality of data pairs. In FIG. 13, 'h' denotes a coefficient indicating a relationship between the threshold voltages at which a maximum number of photons having the same energy intensity are detected and the energies having the maximum intensity in X-ray spectra.

Referring back to FIG. 4, in operation 470, the threshold voltage is calibrated based on the correspondence relationship between energies of X-rays and threshold voltages, which is determined in operation 460. The calibration of the threshold voltage may be usefully used when the intensity of energy of an X-ray in the X-ray detector 330 is distinguished based on a threshold voltage. In addition, since the threshold voltage of the X-ray detector 330 is calibrated by perceiving the correspondence relationship between energies of X-rays and threshold voltages, the method of FIG. 4 may also be applied to general commercial-use X-ray generation devices.

As described above, according to some example embodiments of the present disclosure, the above-described method may be usefully used when the intensity of energy of an X-ray in an X-ray detector is distinguished based on a threshold voltage.

The method of calibrating an X-ray detector, according to some example embodiments, can be written as computer programs and can be implemented in general-use digital computers that execute the programs using a non-transitory computer-readable recording medium. Examples of the computer-readable recording medium include storage media such as magnetic storage media (e.g., Read-Only Memory (ROM), floppy disks, hard disks, etc.) and optical recording media (e.g., Compact Disc (CD)-ROMs or Digital Video Discs (DVDs)).

In addition, some example embodiments of the present disclosure can also be implemented through computer-readable code/instructions in/on a medium, e.g., a computer-readable recording medium, to control at least one processing element to implement some example embodiments. The computer-readable recording medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the computer-readable recording medium may be such a defined and measurable structure including or carrying a signal or information, such as a device carrying a bitstream according to some example embodiments of the present disclosure. The media may also be a distributed network, so that the computer-readable code is stored/transferred and executed in a distributed fashion. Furthermore, the processing element could include a processor or a computer processor, and processing elements may be distributed and/or included in a single device.

While example embodiments have been particularly shown and described, it will be understood by those of ordinary skill in the art that various changes in form and details may be made therein without departing from the spirit and scope of the present invention as defined by the following claims.

What is claimed is:

1. A method of calibrating a first threshold voltage that is a reference of X-ray detection for each unit cell of a plurality of unit cells of an X-ray detector, the method comprising:
   detecting an X-ray by using a plurality of second threshold voltages for each of a plurality of X-rays having spectra at different energy levels;
   determining a correspondence relationship between energies having a maximum intensity in the spectra of X-rays and third threshold voltages at which a maximum number of photons having a same energy intensity are detected; and
   calibrating the first threshold voltage based on the determined correspondence relationship.

2. The method of claim 1, wherein the X-ray detector is a photon-counting detector, and
   wherein the detecting of the X-ray comprises measuring photons having energies greater than the corresponding third threshold voltages.

3. The method of claim 1, wherein the detecting of the X-ray comprises collecting X-ray detection signals from the plurality of unit cells for each of the plurality of second threshold voltages having different values.

4. The method of claim 3, wherein the detecting of the X-ray further comprises correcting the collected X-ray detection signals to reduce errors that may occur according to characteristics of the plurality of unit cells.

5. The method of claim 4, wherein the collecting of the X-ray detection signals comprises:
   collecting the X-ray detection signals a plurality of times without irradiating each corresponding X-ray for each of the plurality of second threshold voltages;
   collecting the X-ray detection signals a plurality of times by irradiating the corresponding X-ray for each of the plurality of second threshold voltages; and
   performing gain-offset correction of the X-ray detection signals collected by irradiating the corresponding X-ray at any one of the plurality of times.

6. The method of claim 5, wherein the gain-offset correction uses mean values of the X-ray detection signals collected the plurality of times at each of the plurality of second threshold voltages.

7. The method of claim 1, wherein each of the energies having the maximum intensity in a spectrum of a corresponding X-ray is an energy showing the maximum intensity in an X-ray spectrum obtained by estimating a spectrum of the corresponding X-ray based on a half-value layer of the corresponding X-ray spectrum measured by using a spectrum simulator.

8. The method of claim 7, wherein the energy showing the maximum intensity in the estimated X-ray spectrum is extracted by performing regression analysis using a Gaussian function.

9. The method of claim 1, wherein each of the third threshold voltages at which the maximum number of photons having the same energy intensity are detected is obtained by using a first function indicating a measured number of photons having energy greater than each third threshold voltage for the plurality of second threshold voltages.

10. The method of claim 9, wherein each of the third threshold voltages at which the maximum number of photons having the same energy intensity are detected is a second threshold voltage having a maximum value in a second function indicating a number of photons having energy corresponding to the third threshold voltage by differentiating the first function with respect to the second threshold voltage.

11. The method of claim 10, wherein the second threshold voltage having the maximum value in the second function is extracted by performing regression analysis using a Gaussian function.

12. The method of claim 10, wherein if a value of the first function exceeds permissible noise, a substitution function in which noise of an inflection point area of the first function, which corresponds to a maximum value area of the second function, is used, and a function obtained by differentiating the substitution function is used as the second function.

13. The method of claim 1, wherein the determining of the correspondence relationship comprises determining the correspondence relationship by performing linear regression analysis when energy having the maximum intensity in a spectrum of each X-ray and a third threshold voltage at which a maximum number of photons having the same energy intensity are detected for the X-ray are determined.

14. The method of claim 1, wherein the plurality of X-rays are X-rays having the spectra at different energy levels by changing a tube voltage to be applied to a cathode and an anode of an X-ray tube for generating an X-ray or by changing a material forming the anode of the X-ray tube.

15. A non-transitory computer-readable recording medium storing a computer-readable program for executing the method of claim 1.

* * * * *